E. B. FAHNESTOCK.
METAL BENDING MACHINE.
APPLICATION FILED AUG. 24, 1906.

979,142.

Patented Dec. 20, 1910.
6 SHEETS—SHEET 1.

Attest:
Mitchell
A. L. O'Brien

Inventor:
Ernest B. Fahnestock
by Dickerson, Brown,
Raegener & Binney Attys.

E. B. FAHNESTOCK.
METAL BENDING MACHINE.
APPLICATION FILED AUG. 24, 1906.

979,142.

Patented Dec. 20, 1910.

Attest:
J. S. Mitchell
A. L. O'Brien

Inventor:
Ernest B. Fahnestock
by Dickerson, Brown,
Raegener & Binney Attys.

E. B. FAHNESTOCK.
METAL BENDING MACHINE.
APPLICATION FILED AUG. 24, 1906.

979,142.

Patented Dec. 20, 1910.
6 SHEETS—SHEET 5.

Attest:
E. Mitchell
A. L. O'Brien

Inventor:
Ernest B. Fahnestock
by Dickerson, Brown,
Raegener & Binney Atty's.

E. B. FAHNESTOCK.
METAL BENDING MACHINE.
APPLICATION FILED AUG. 24, 1906.

979,142.

Patented Dec. 20, 1910.

Attest:
C. Mitchell
A. L. O'Brien

Inventor:
Ernest B. Fahnestock
by Dickerson, Brown,
Raegener & Binney Attys

UNITED STATES PATENT OFFICE.

ERNEST B. FAHNESTOCK, OF NEW YORK, N. Y., ASSIGNOR TO THE FAHNESTOCK ELECTRIC COMPANY, A CORPORATION OF WEST VIRGINIA.

METAL-BENDING MACHINE.

979,142.  Specification of Letters Patent.  Patented Dec. 20, 1910.

Application filed August 24, 1906. Serial No. 331,833.

*To all whom it may concern:*

Be it known that I, ERNEST B. FAHNESTOCK, a citizen of the United States, and resident of the borough of Manhattan, city, county, and State of New York, have invented certain new and useful Improvements in Metal-Bending Machines, of which the following is a specification accompanied by drawings.

This invention relates to metal bending machines, and the objects of the invention are to enable narrow metal blanks to be stamped and then bent into the required shape.

The machine may be used for any purpose for which it is applicable, but it is particularly adapted for making spring fastening devices or binding posts for electrical conductors. Each fastening device is made of a single piece of metal cut from a continuous strip of metallic ribbon, which is automatically fed to the machine.

Further objects of the invention will hereinafter appear and to these ends the invention consists of a metal bending machine for carrying out the above objects embodying the features of construction, combinations of elements, and arrangement of parts having the general mode of operation substantially as hereinafter fully described and claimed in this specification and shown in the accompanying drawings, in which,—

Figures 13, 14, 15, 16, 17:
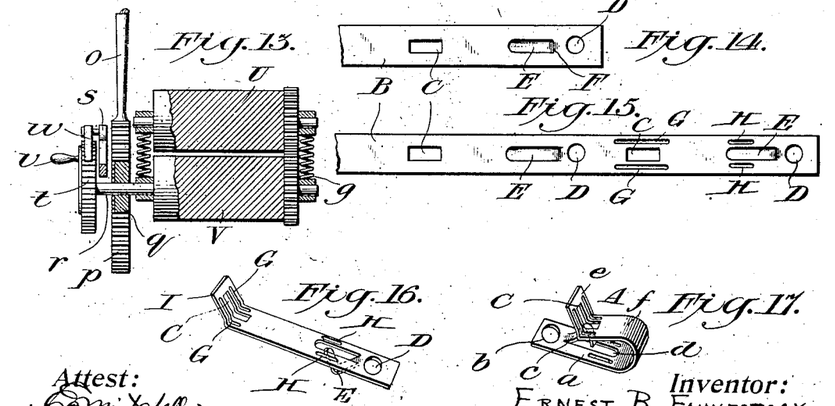
Fig. 13 is a transverse sectional detail view through the feeding rolls.
Fig. 14 is a detail top plan view illustrating the first operation carried out upon the metal strip by the stamping mechanism.
Fig. 15 is a detail top plan view illustrating the first and second operations carried out on the metal strip by the stamp.
Fig. 16 is a perspective view of the metal blank cut from the strip and adapted to be fed to the bending mechanism.
Fig. 17 is a detail perspective view of the completed spring fastening device after bending.

In order to more fully comprehend the construction and operation of the machine, the article made by the machine will first be referred to as illustrated in detail in Figs. 14, 15, 16 and 17. In Fig. 17, A represents the product of the machine in the form of a spring binding post or metallic fastening device for electrical conductors. This device comprises a single piece of metal suitably stamped and bent into the form shown for holding and gripping a wire. The device comprises a base $a$ having an aperture $b$ for securing the binding post to a support. From the base $a$ projects a hook-shaped member $c$ which is cut out of the slot or aperture $d$ and forms one of the retaining members of the fastening device. One end $e$ of the metal of the blank is bent at an angle as shown to form a retaining portion adapted to coöperate with the hook-shaped member $c$ when the blank is bent upon itself into U-shaped form, to provide a spring member $f$. By forcing the spring member toward the hook-shaped retaining portion $c$ a wire may be inserted between the angular retaining portions, and this wire will be firmly gripped and retained in position by the retractive force of the spring.

Figure 6:
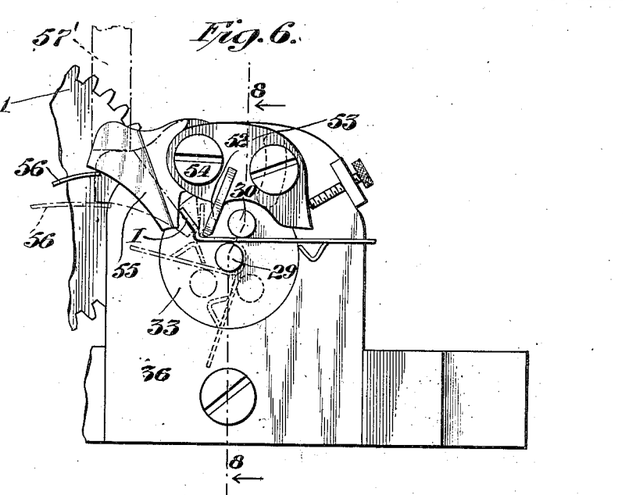
Fig. 6 is an enlarged detail elevation of the bending mechanism partly broken away, showing the blank in the process of bending from start to finish.

In the process of manufacture the end of a continuous strip or roll of metallic ribbon B is fed to the machine and the first stamping operation punches the end of the ribbon as illustrated in Fig. 14. Between the slot C and the aperture D is formed the tongue E cut or stamped from the metal but left connected to the blank at the point F. The metallic ribbon is then fed forward automatically as the punch head moves upward, and on the next stroke of the punch head the longitudinal depressions G are formed at each side of the aperture C, while the longitudinal depressions H are formed at each side of the tongue E for strengthening and stiffening the metallic fastening device. At the same time the portion of the strip immediately in the rear is cut and formed as illustrated in Fig. 15. As the punch head then recedes preparatory to the third downward stroke, the metallic ribbon is fed forward again and the third operation takes place, which forms the blank ready for bending as illustrated in Fig. 16, in which figure the blank is shown cut from the metallic ribbon and having the tongue E bent into hook-shaped form, while the end I is bent at an angle to the remainder of the blank. At the same time that the blank shown in Fig. 16 is formed, the metal of the strip immediately in the rear thereof is cut and formed as shown in Fig. 15, so that after the machine is started, and in operation, the three operations of forming the completed blank take place simultaneously upon the metal of the strip as it is fed forward. The blank completed by the third stroke is then pushed from the table or otherwise fed to the bending mechanism as illustrated in Fig. 6, in which the blank is shown in position in full lines ready to be bent into final form as illustrated in Fig. 17.

Referring to the drawings J and K represent the main frame of the machine and L is the shaft to which power is applied by means of the pulley O. The shaft L is provided with a crank P and crank shaft Q connected to the cross head R sliding in the guides S and carrying the punch head T, provided with suitable cutting and punching devices for forming the blank. The metallic strip B is fed through the feed rolls U and V to the table W, which is suitably recessed to receive the cutting and punching devices, and in this instance provided with a cover V' having apertures for the reception of said devices.

The feed rolls U and V are suitably mounted at one side of the machine in the brackets X and Y. As shown, the bracket X is pivoted at Z and suitable springs $g$ normally press the feed rolls together.

Suitable means are provided for actuating the feed rolls, step by step, in this instance, the end of the shaft L opposite the pulley O being provided with an eccentric pin $h$ operating in a slot $i$ in the rod $j$, pivoted at $k$ to the frame of the machine. The other end $l$ of this rod is connected to the vertical connecting rod $o$, which is provided at its lower end with a rack $p$ engaging a pinion $q$ loose upon the shaft $r$ of the lower roll V. This pinion $q$ is provided with a bracket $s$ fast thereto extending outwardly over a ratchet wheel $t$ fast to the shaft $r$, and a pawl $u$ on said bracket is adapted to coöperate with said ratchet wheel, so that on every up-stroke of the cross head R and punching mechanism the ratchet wheel $t$ will be rotated forward and the feed rolls U and V will be actuated to feed the metallic ribbon B across the table W a given distance in readiness for the next downward stroke of the punching mechanism. As the punching mechanism descends to cut and punch the blank, the pawl $u$ will slide backward over the ratchet wheel $t$ without feeding the ribbon. Preferably, the ratchet wheel $t$ is provided with a handle $v$ to enable the material to be fed by hand if desired, as for instance when the machine is started. Any suitable punching mechanism and feeding mechanism may be provided instead of that disclosed.

Figures 1, 19:
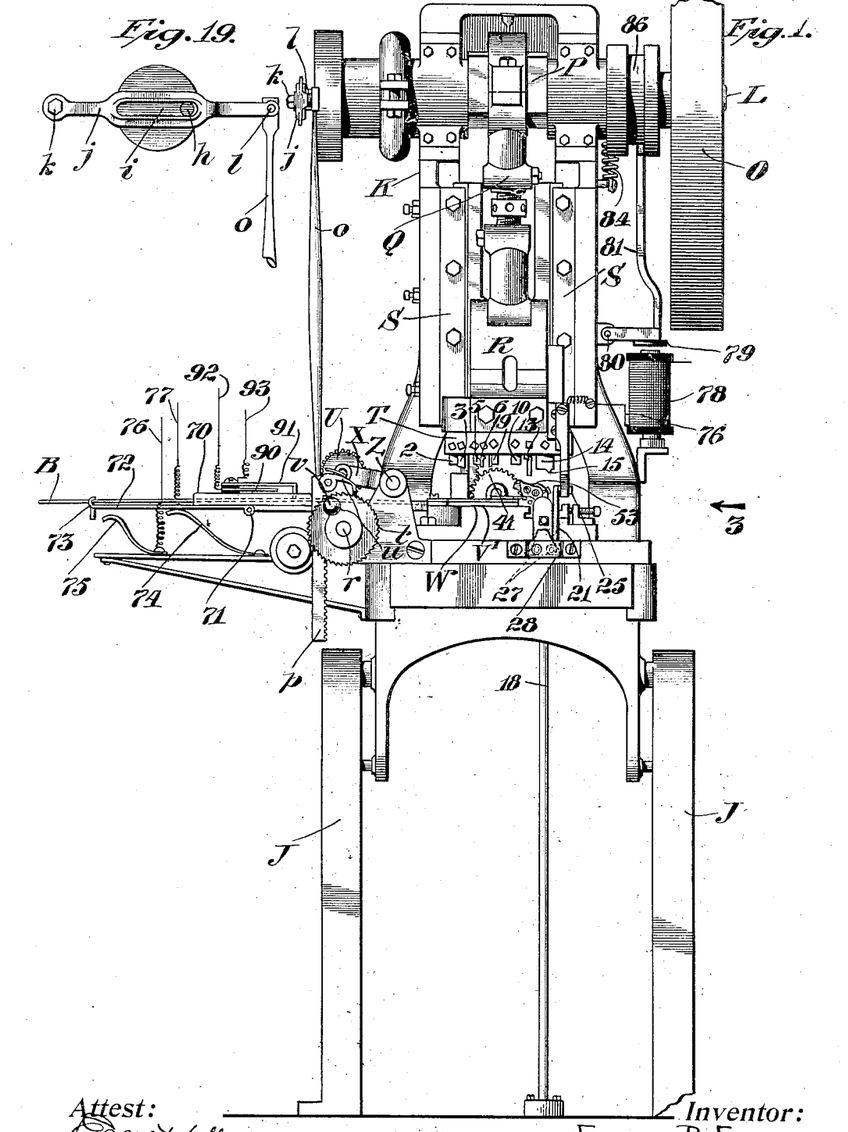
Figure 1 is a front elevation of the machine.
Fig. 19 is a detail end view of a cam operating mechanism for the feed rolls.
Figure 2:
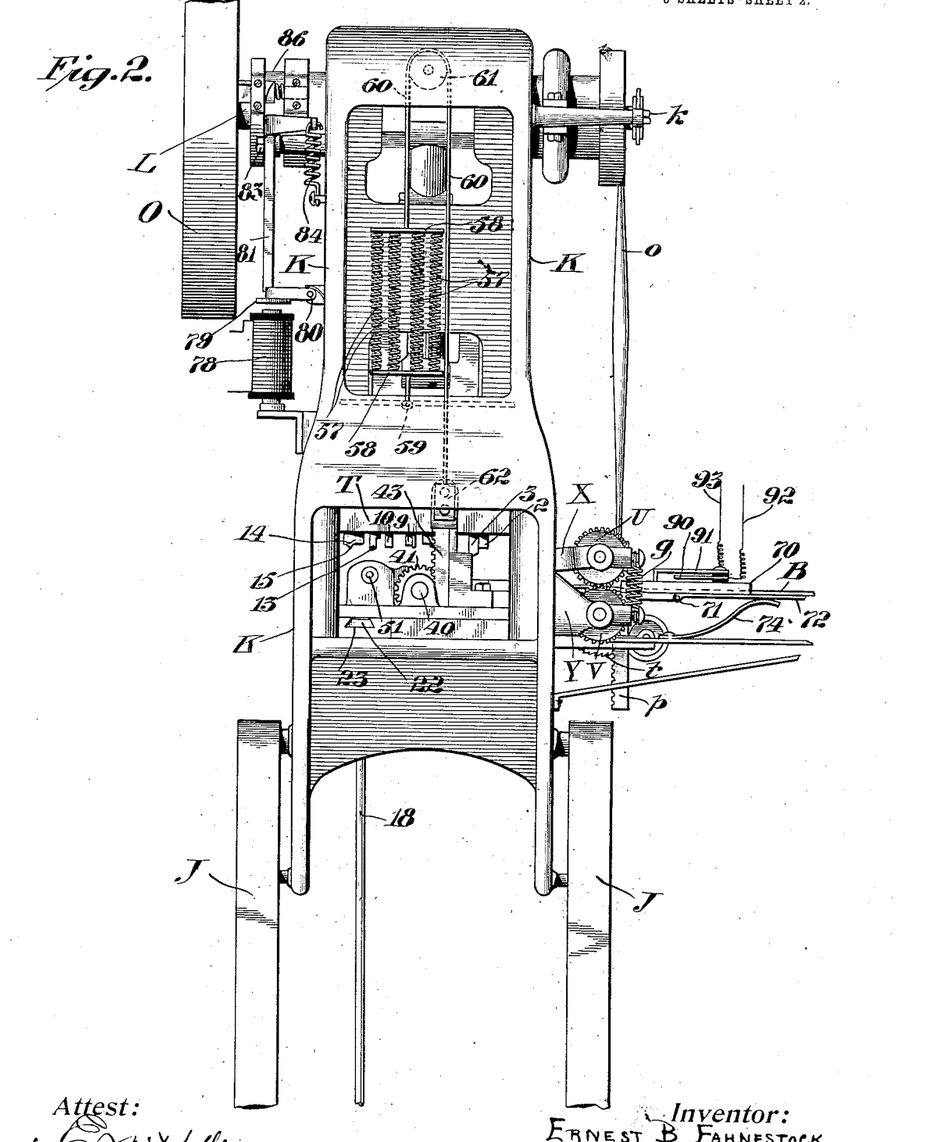
Fig. 2 is a rear elevation.
Figures 3, 18, 20:
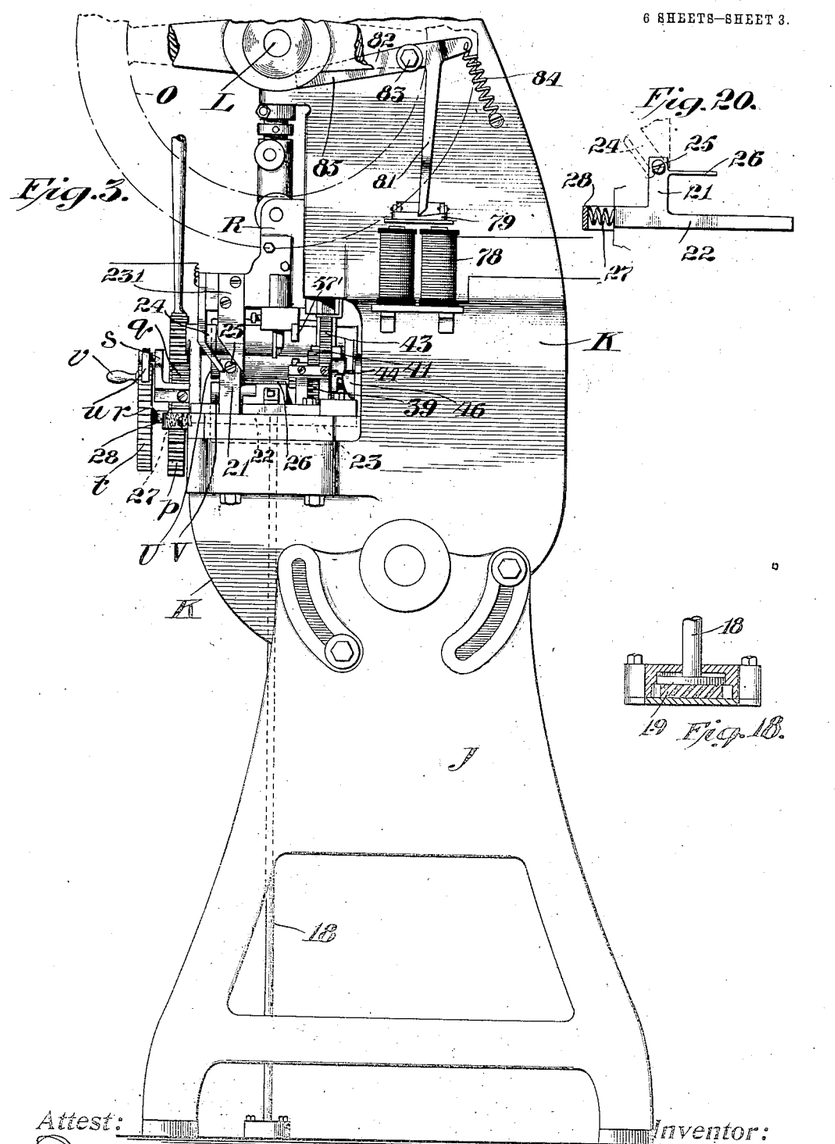
Fig. 3 is a side elevation looking in the direction of the arrow 3 in Fig. 1.
Fig. 18 is an enlarged detail sectional view of the foot of the rod that supports the movable pad on the table.
Fig. 20 is a detail sectional view taken through the pusher for feeding the blank to the bending mechanism.
Figures 4, 5:
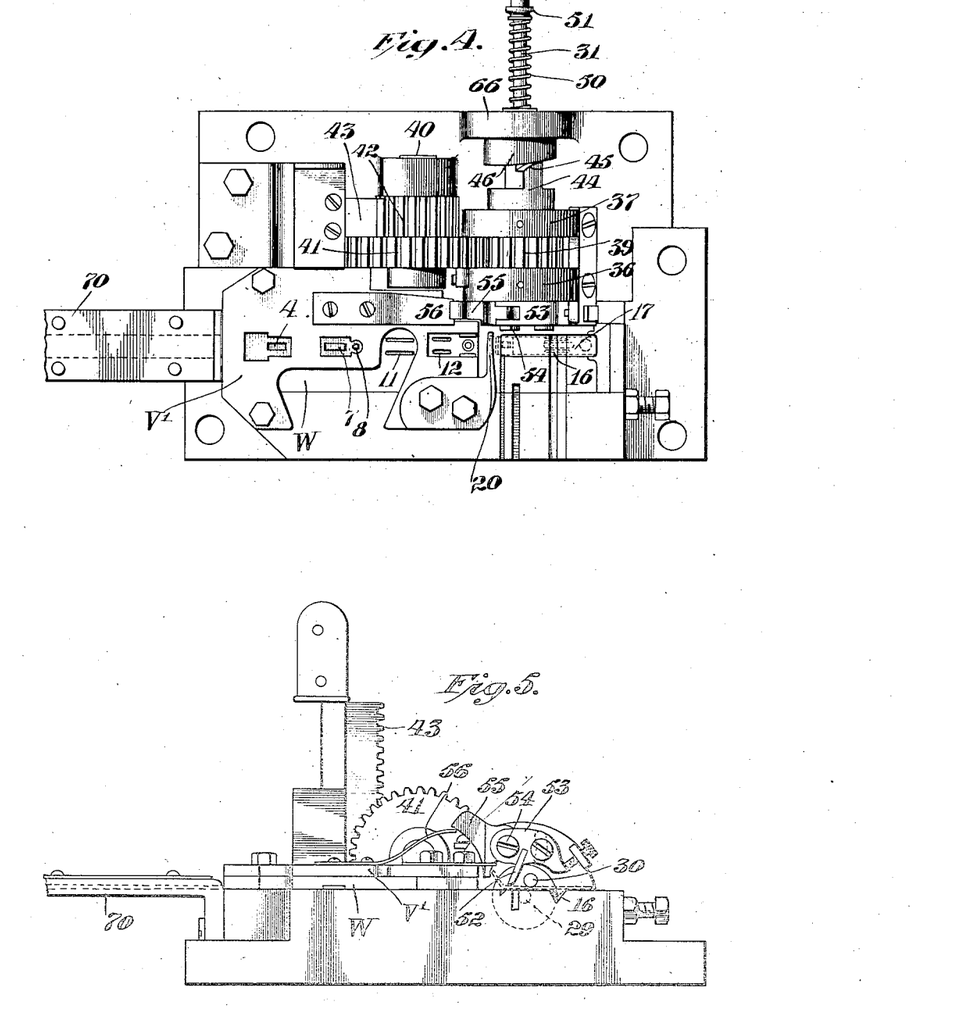
Fig. 4 is an enlarged detail top plan view of the central portion of the machine, including the table and bending mechanism.
Fig. 5 is a front elevation of Fig. 4.

The punch head T is provided with suitable cutters and punchers. In this instance said head is also provided with a punch 2 for stamping a suitable name plate or other printed matter upon the blank. The punch 3 is adapted to punch the apertures or slots C in the material and enters the aperture 4 in the table W. The punches 5 and 6 respectively punch out the tongue E and the aperture D in the blank, and are adapted to enter the apertures 7 and 8 in the table. The punches 9 and 10 respectively form the longitudinal depressions or ribbons G and H in the blank, and these punches coöperate with the depressions 11 and 12 in the table. The cutter 13 is adapted to cut off the blank in the form shown in Fig. 16, while the punch 14 bends the end I of the blank and the tongue E into the form shown in Fig. 16. The punch 14 as shown in Fig. 1 is substantially the length of the blank and is provided with a central angular projection 15, which forces the tongue E downwardly into the angular groove 16 in the movable pad 17 of the table. This pad 17 as shown is carried on the upper end of a vertical rod 18 having a cushion 19 of any suitable material, as for instance, rubber, under its foot, as illustrated in Fig. 18. During the third and last operation upon the metallic ribbon, the blank is resting upon the pad 17, with the end I which has been cut lying upon the projection 20, extending across the table. As the punch head descends, the tongue E of the blank is forced into the groove 16 and the pad 17 is forced downwardly by the pressure of the punch head, thereby carrying the body of the blank downwardly and turning up the end I which rests upon the projection 20. As the punch head rises on the return stroke of the machine, the pad 17 rises, and the blank is in position to be pushed into the bending mechanism. I am not to be understood as limiting the invention to the precise form of table and punching mechanism shown, for any suitable mechanism may be provided for this purpose.

Suitable means are provided for pushing the blank from the table to the bending mechanism, and in this instance, the pushing mechanism consists of a slide having an upright portion 21 and a horizontal portion 22, which slides in a dovetail groove 23 in the frame of the machine. The upright portion 21 is provided with a pusher 26 extending outwardly therefrom over the table opposite the movable pad 17, and is adapted to push the blank from the pad into the bending mechanism. Means are provided for retracting the pushing mechanism as the punching mechanism descends, and for moving the pushing mechanism in the opposite direction as the punching mechanism ascends. As shown, the cross head R is provided with a downwardly extending portion 231 having a guide way or cam slot 24 therein, which extends vertically for a portion of its length and then at an angle toward the table for the remainder of its length. The upright portion 21 of the slide is provided with a pin or follower 25 which moves in the cam slot or guide way 24. As the cross head R descends the pin 25 and the slide will be moved outwardly away from the table carrying the pusher 26 off the table. As the cross head R and punching mechanism ascends the slide is released and the compression springs 27 arranged between the slide and the abutment 28 force the slide toward the table, thereby carrying the pusher 26 across the pad 17 and pushing the blank therefrom.

Figure 8:
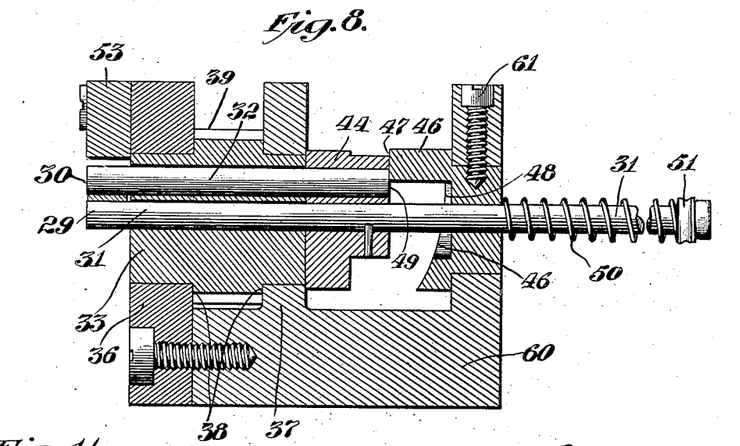
Fig. 8 is a longitudinal sectional view of the bending mechanism on the line 8—8 of Fig. 6.
Figure 11:
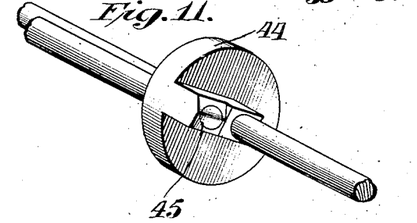
Fig. 11 is a perspective view of the movable cam of the bending mechanism.
Figure 12:
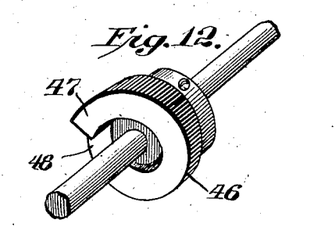
Fig. 12 is a perspective view of the stationary coöperating cam surface of the bending mechanism.

The bending mechanism is arranged opposite the pad 17, and is provided with longitudinally movable studs or projections 29 and 30 between which the blank is forced by the pusher. These projecting studs 29 and 30 form the ends of shafts or rods 31 and 32, as illustrated in the sectional view in Fig. 8. The ends 29 and 30 normally project beyond the face of the block 33 in readiness to receive the blank and then the stud 30 is revolved around the other stud 29 to bend the blank as illustrated in the dotted, and dot and dash lines in Fig. 6. After the bending has been completed the rods 31 and 32 are automatically withdrawn inwardly to release the completed fastening device which then drops into a suitable receptacle, and the rods 31 and 32 again move outwardly to project the ends 29 and 30 in readiness for the reception of the next blank.

As shown, the block 33 is revolubly supported in its bearings 36 and 37, the periphery of the block being provided with shoulders 38 to prevent longitudinal movement, and gear teeth 39 being provided around the central portion of the periphery for rotating the block. A shaft 40 supported in suitable bearings is provided with a gear 41 meshing with the gear formed by the teeth 39 on the block 33, and the shaft 40 is also provided with a pinion 42 fast thereon and meshing with a rack 43 adapted for vertical movement and actuated downwardly by the downward movement of the cross head R which abuts against the top of the rack and forces it down, thereby rotating the pinion 42, the shaft 40, the gear 41 and the rotary block 33, thereby rotating the shaft 32 and its end 30 around the shaft 31 and its end 29 because as shown the shaft 31 forms the axis of the block 33.

Connected to the shaft 31 and separate from the block 33 is a cam 44 having a cam surface 45 adapted to coöperate with the stationary cam surface 46, which is provided with a high portion 47 and a low portion 48. This cam is adjustably secured in the block 60 by means of a set screw 61. The rear end 49 of the shaft 32 is secured in the cam 44 and extends through the same, and is preferably adapted to bear upon the cam surface 46, and when the cam surface 45 and shaft 32 bear against the high portion 47 of the cam 46 the shaft ends 29 and 30 will be projected outwardly beyond the face of the block 33, because the shaft 32 will be forced outwardly and the cam 44 will be moved toward the block 33. The shaft 31 is provided with a retracting compression spring 50, shown in this instance as a coiled spring, arranged about the shaft and adapted to be compressed between the cam 46 and the collar 51 fast to the shaft. As the cam 44 is moved toward the block 33, the shaft 31 will also be moved in the same direction, thereby compressing the spring 50 between the cam 46 and the collar 51. When the cam 44 rests against the low portion 48 of the cam 46, the ends 29 and 30 of the shafts 31 and 32 will be retracted substantially flush with the surface of the block 33.

The shafts 31 and 32 are in normal position with their ends 29 and 30 projecting outwardly beyond the face of the block 33, when the blank is pushed from the table between the ends 29 and 30, during the upward movement of the cross head R. As the cross head descends on the next stroke, the rack 43 is forced downward, thereby actuating the block 33 and rotating it clockwise as Fig. 6 is viewed so that the stud 30 is rotated around the stud 29 to bend the blank. The cam 44 is also rotated and consequently the spring 50 on shaft 31 tends to retract the shaft 31, but is prevented from so doing owing to the friction between the blank and the stud 29 as the blank is bent. The blank in being bent around the stud 29 grips it tightly and prevents the shaft 31 from being withdrawn. An arm or finger 52, illustrated in Fig. 6, is connected to an adjustable block 53 and projects downwardly into the angle formed between the end I of the blank and the body portion, thereby holding one end of the blank rigidly in position, while the bending takes place. The block 53 is pivoted on the screw 54, upon which is also pivoted the finger 55, which is adapted to swing toward the end I of the blank and bend said end inwardly toward the finger 52 as illustrated in dotted lines to form a sharp angle at the bend. A suitable spring 56 is provided for retracting the finger 55, and a downwardly extending projection 57' on the die block T is adapted to bear against the finger 55 and force it against the end I of the blank as the cross head R descends, thus completing the bending of the fastening device.

Figures 7, 9, 10:
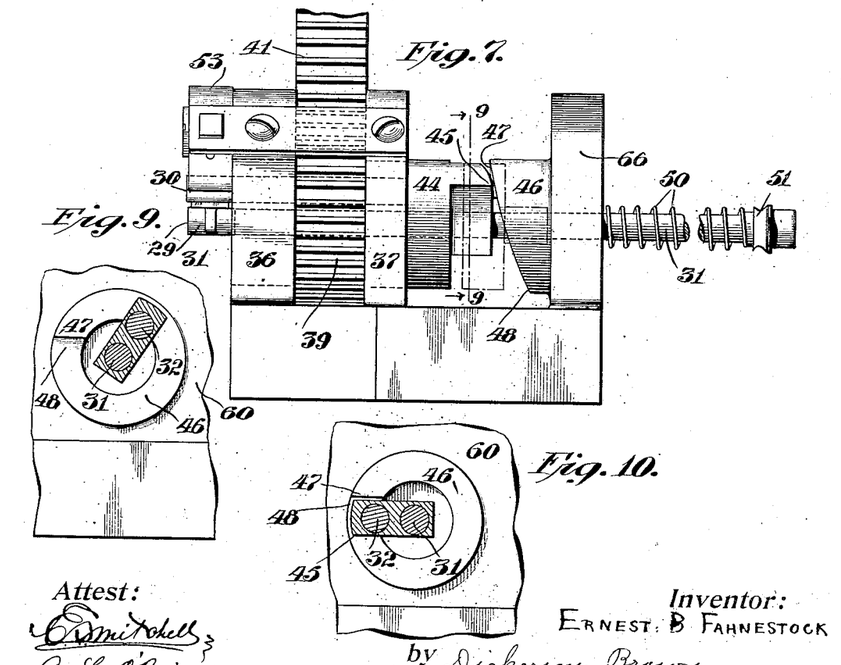
Fig. 7 is a side elevation of Fig. 6.
Fig. 9 is a transverse sectional detail view on the line 9—9 of Fig. 7 looking in the direction of the arrows.
Fig. 10 is a view similar to Fig. 9 with the movable cam in a different position.

Means are provided for moving the rack 43 upwardly as the cross head R ascends, in this instance suitable retracting springs 57 being provided for this purpose. As shown, a plurality of springs 57 are connected between cross pieces 58, one of said cross pieces being connected to the frame of the machine at 59, while the other cross piece is connected to a band 60 of suitable material, which passes over the pulley 61 and is connected to the projection 62 on the rack 43. The springs 57 have been placed under tension as the rack 43 is forced down by the punching mechanism and when the downward pressure is released, the springs pull the rack 43 upward. As soon as the punching mechanism starts on its upward stroke, the pressure on the finger 55 is released, thereby releasing the grip of the blank upon the end 29 of rod 31, which permits said rod to be withdrawn by the force of the retracting spring 50, and shaft 31 together with cam 44 are retracted because the cam surface 45 has been rotated into position opposite the low portion 48 of the cam as illustrated in Fig. 10. At substantially the same time the rack 43 is raised under the influence of the springs 57, thereby rotating the block 33 counter clockwise as Fig. 6 is viewed, or in the opposite direction to that in which it is rotated to bend the blank. The blank has been released and drops downwardly into a suitable receptacle, and the cam 45 is carried around the cam surface 46 from the low portion 48 to the high portion 47, thereby forcing the cam 44 outwardly toward the block 33 and projecting the ends 29 and 30 of the rods 31 and 32 beyond the face of said block 33 into receiving position in readiness for the next blank. In the upward stroke of the punching mechanism, said mechanism moves upwardly a short distance above the upper end of the rack 43 and out of contact therewith, so that there is an interval in the stroke before the punching mechanism again descends into contact with the rack 43, and during this interval the rotary block 33 is stationary with the studs 29 and 30 in receiving position. As soon as the blank has been received between said studs the machine is so timed that the punching mechanism again carries the rack 43 downward.

Electrical means are provided for automatically stopping the machine when the metallic ribbon is used up and also for stopping the machine in case of accident, as for instance, if the ribbon becomes tangled or is caught and held for any reason. A suitable support 70 is provided having a groove therein, through which the ribbon B passes. Hinged beneath this support at the point 71 is a flexible arm 72, over the end 73 of which the ribbon B passes, and preferably the roll from which the ribbon is being unwound is arranged at a point below the end 73 of arm 72, so that the weight of the ribbon bears upon this arm and the arm itself is supported in a substantially horizontal position by means of the spring 74. If, for any reason, the ribbon should become caught and held, the end 73 of arm 72 would be forced down into contact with the contact spring 75 connected in circuit with the wire 76. Since the arm 72 is in circuit with the wire 77 and a suitable source of supply a circuit will be completed through any suitable form of electro-responsive device, as for instance a magnet 78 adapted to control suitable mechanism for disconnecting the driving mechanism of the machine. Preferably the contact finger 75 is insulated from the frame of the machine while the wire 76 is connected to a suitable source of supply. The wire 77 also adapted to be connected with the source of supply is connected to the arm 72 and from thence through the frame of the machine to the magnet 78, or any other suitable connections may be provided. The energizing of magnet 78 attracts armature 79 pivoted at 80 to the frame of the machine and thereby releasing the arm or stop 81. Said arm is connected to the lever 82 pivoted at 83 to the frame of the machine, the outer end of said lever being provided with the retracting spring 84, while the inner end 85 is adapted to throw out the clutch 86 which connects the driven pulley O to the driven shaft L, thereby stopping the machine. Likewise electrical means are provided for automatically stopping the machine when the metallic ribbon B is used up. As shown, two spring contacts 90 and 91 are provided upon the guide 70 insulated from each other and from the guide with circuit wires 92 and 93 connected thereto, in the circuit of which is arranged the source of supply and the magnet 78. One end of the spring contact 91 is adapted to bear upon the metallic ribbon B, and as soon as the ribbon is used up, contact is made between contacts 90 and 91, thereby completing the circuit, energizing the magnet 78 and throwing out the clutch mechanism 86.

The operation of the machine may be recapitulated as follows: The metallic ribbon B, from which the blanks are formed, is fed across the table W, step by step, by means of the feed rolls U and V, the feeding taking place as the punching mechanism makes its upward stroke. After the machine is started and is in operation, each downward stroke of the punching mechanism makes the preparatory cuts and punches in portions of the metallic ribbon, and at the same time completes one blank as illustrated in Fig. 16. The pushing mechanism has been moved away from the table upon the downward stroke of the punching mechanism, but upon the upward stroke the pusher 26 moves transversely across the table and pushes the blank between the studs 29 and 30 of the bending mechanism which are normally in receiving position projecting beyond the face of the block 33, and are momentarily at rest, owing to the timing of the machine so that the blank may be received between them preparatory to being bent into complete form, as illustrated in Fig. 17. Upon the next downward stroke of the punching mechanism the block 33 is rotated in its bearings, thereby rotating the stud 30 around the stud 29 and bending the blank around the stud 29 into the positions indicated in Fig. 6. The friction between the blank and the stud 29 in the process of bending is sufficient to prevent the shaft 31, of which the stud forms the end, from being withdrawn by the action of the spring 50. As soon, however, as the finger 55 has completed the bending of the end of the blank and the punching mechanism starts on its upward stroke, the frictional grip of the blank upon the stud 29 is released and the shaft 31, together with shaft 32 and cam 44 are snapped backward, or withdrawn against the low portion of the cam 46 under the retractive influence of the spring 50, thereby permitting the finished spring fastening device to drop into a suitable receptacle. The upward movement of the punching mechanism permits the springs 57 to move the rack 43 upward, and thereby rotate the block 33 backwardly which moves the cam surface 45 around the cam 46 from the low portion to the high portion, thereby projecting the ends 29 and 30 of shafts 31 and 32 outwardly into receiving position.

Obviously some features of this invention may be used without others and the invention may be embodied in widely varying forms.

Therefore, without limiting the invention to the devices shown and described, and without enumerating equivalents, I claim and desire to obtain by Letters Patent the following:

1. In a metal bending machine, the combination of a rotary support or holder, a longitudinally movable shaft passing through the axis thereof, a second longitudinally movable shaft in said holder, means for projecting and retracting said shafts, and means for rotating said support or holder.

2. In a metal bending machine, the combination of a rotary support or holder, a longitudinally movable shaft passing through the axis thereof, a second longitudinally movable shaft in said holder, means for projecting and retracting said shafts, and means for rotating said support or holder in either direction.

3. In a metal bending machine, the combination of a rotary support or holder, axial and eccentrically arranged longitudinally movable shafts therein, and means for rotating said holder in either direction.

4. In a metal bending machine, the combination of a support, central and outer longitudinally movable studs adapted to receive the metal ribbon to be bent between them, means for projecting said studs beyond the support into receiving position, means for rotating the outer stud about the other to wrap the ribbon around the central stud, thereby clamping said studs against longitudinal movement due to the frictional contact pressure between the ribbon and the studs, and means for retracting the studs when the said contact pressure is released.

5. In a metal bending machine, the combination of a support, central and outer longitudinally movable studs adapted to receive the metal ribbon between them, means for rotating the outer stud about the central stud in one direction, and at the same time projecting said studs into receiving position, and means for rotating said outer stud in the opposite direction to wrap the ribbon partially around the central stud, thereby clamping said studs against longitudinal movement due to frictional pressure between the ribbon and the studs, and means for retracting the studs when said pressure is released.

6. In a metal bending machine, the combination of a rotary support, axial and eccentrically arranged longitudinally movable shafts therein, a longitudinally movable cam connected to move with said shafts, a stationary cam having high and low portions adapted to coöperate with said movable cam, means for rotating said support and the movable cam in one direction, thereby causing said cam to ride up on the high surface of the stationary cam and thus project the ends of the shafts beyond the support into receiving position, means for rotating the support and movable cam in the opposite direction, and means for retracting said shafts longitudinally.

7. In a metal bending machine, the combination of a table, means for feeding a strip of metal thereto, mechanism for forming a blank from such strip on such table, rotary bending mechanism, and means for feeding the blank transversely across the table to the bending mechanism.

8. In a metal bending machine, the combination of a table reciprocating blank forming mechanism arranged to coöperate therewith, means for feeding a strip of metal thereto step by step, and means for pushing the blank transversely to the line of movement of the strip across the table to the bending mechanism.

9. In a metal bending machine, the combination of a table, reciprocating cutting and punching mechanism for forming the blank to be bent, rotary bending mechanism, and a pusher for pushing the blank transversely across the table to the bending mechanism.

10. In a metal bending machine, the combination of a table, reciprocating cutting and punching mechanism for forming the blank to be bent, rotary bending mechanism, and a pusher for pushing the blank transversely across the table to the bending mechanism, and means controlled by the cutting and punching mechanism for actuating said bending mechanism.

11. In a metal bending machine, the combination with a table, means for feeding a strip of metal thereto, step by step, blank forming mechanism, rotary bending mechanism, means for feeding the blank from the table to the bending mechanism, and means for rotating said bending mechanism in one direction or the other connected to be operated by the blank forming mechanism.

12. In a metal bending machine, the combination of a table, means for feeding a strip of metal thereto, reciprocating cutting and punching mechanism for forming the blank, rotary bending mechanism, means for pushing the blank transversely across the table to the bending mechanism, and means connected to be operated by the punching mechanism for rotating said bending mechanism in one direction, and means for rotating said bending mechanism in the opposite direction.

13. In a metal bending machine, the combination of a table, means for feeding a strip of metal thereto step by step, reciprocating cutting and punching mechanism for forming the blank to be bent, rotary bending mechanism, a pusher for pushing the blank transversely across the table into the bending mechanism, said bending mechanism being provided with longitudinally movable studs normally in receiving position adapted to receive the metal blank between them, and means controlled by the punching mechanism for rotating one stud about the other to bend the blank.

14. In a metal bending machine, the combination of a table, feeding mechanism, blank forming mechanism, rotary bending mechanism, means for pushing the blank from the table to the rotary bending mechanism, means connected to be operated as the blank forming mechanism moves upward for rotating the bending mechanism in one direction, and means controlled by the down stroke of the blank forming mechanism for rotating the bending mechanism in the opposite direction.

15. In a metal bending machine, the combination of a table, means for feeding a strip of metal thereto, reciprocating blank forming mechanism, rotary bending mechanism provided with bending studs, means for pushing the blank from the table into a position between said studs, means connected to be operated as the blank forming mechanism moves upward for rotating said studs into receiving position, and means controlled by the down stroke of the blank forming mechanism for rotating one stud about the other to bend the metal blank.

16. In a metal bending machine, the combination of a table, means for feeding a strip of metal thereto, reciprocating blank forming mechanism, rotary bending mechanism provided with bending studs, means for pushing the blank from the table between said studs, means connected to be operated as the blank forming mechanism moves upward for rotating said studs into receiving position, means for permitting said studs to remain stationary in receiving position while the blank is pushed between said studs, and means controlled by the down stroke of the blank forming mechanism for rotating one stud about the other to bend said blank.

In testimony whereof I have signed this specification in the presence of two subscribing witnesses.

ERNEST B. FAHNESTOCK.

Witnesses:
OLIN A. FOSTER,
HERBERT G. OGDEN.